June 5, 1928.  
L. ROUANET  
1,672,426  
ANTITHEFT DEVICE FOR MOTOR VEHICLES  
Filed March 17, 1927  2 Sheets-Sheet 1
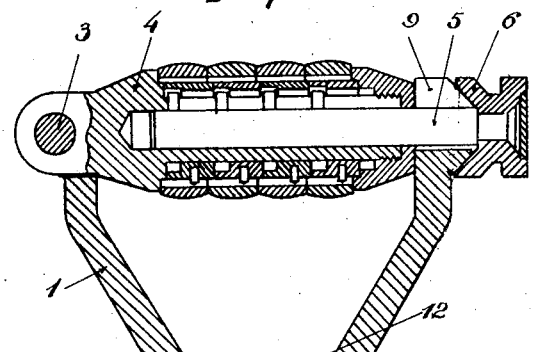
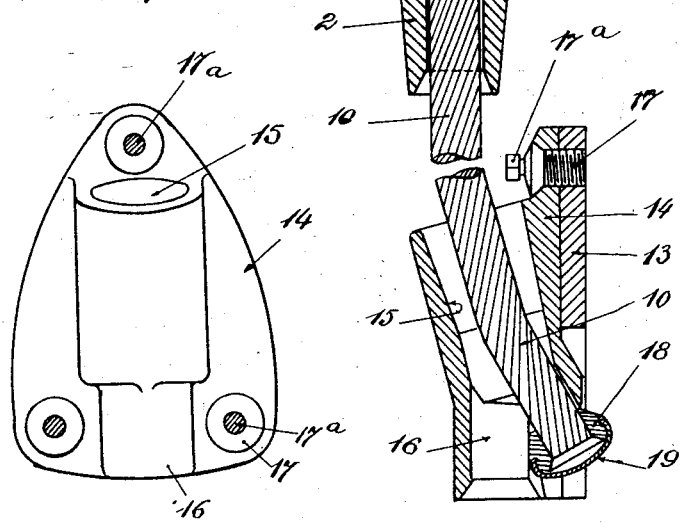
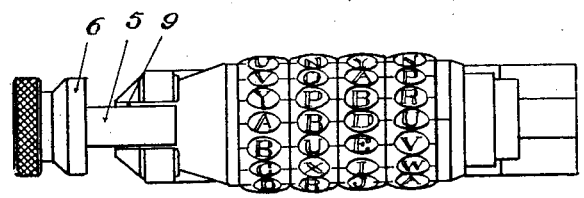
L. Rouanet  
INVENTOR  
By: Marles & Clerke  
Attys.

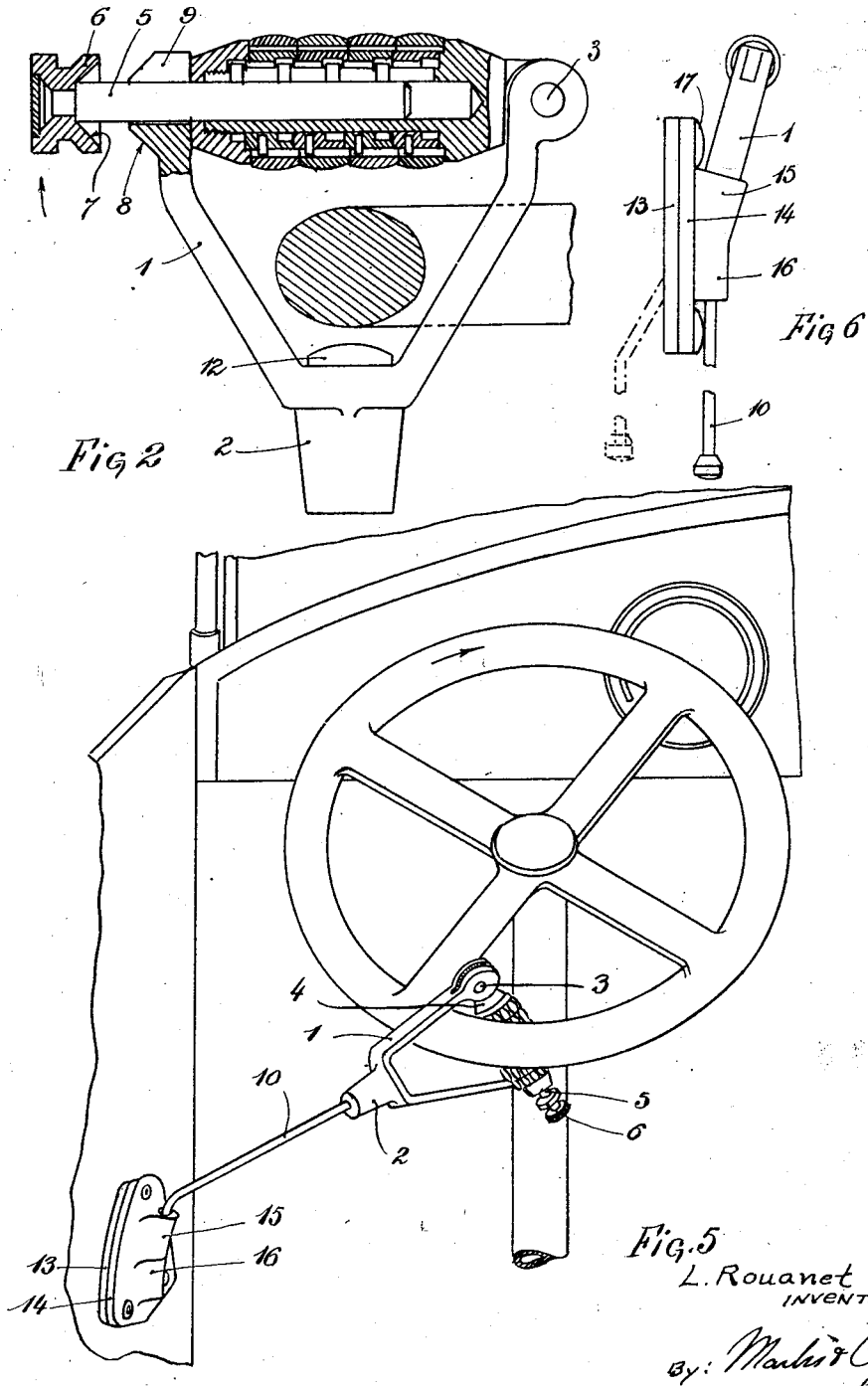

Patented June 5, 1928.

1,672,426

UNITED STATES PATENT OFFICE.

LOUIS ROUANET, OF IVRY-PORT, FRANCE, ASSIGNOR TO COMPAGNIE D'APPLICATIONS MECANIQUES, OF IVRY-PORT, FRANCE, A FRENCH COMPANY.

ANTITHEFT DEVICE FOR MOTOR VEHICLES.

Application filed March 17, 1927, Serial No. 176,272, and in France April 14, 1926.

The present invention has for its object an anti-theft device for motor-vehicles, acting on the steering mechanism, to prevent the drive of the vehicle or thwarting the towing of the same with a purpose of theft.

The various devices of this type as already proposed and in which the locking device acts on the steering fly wheel, while it is secured to a fixed part of the vehicle which may be either the tubular support surrounding the steering pillar, or the carriage-body, have proved unsatisfactory because they are not easily adaptable to the various types of bodies, or because changes are necessary in some of the members of the steering gear mechanism.

The invention has for its object to overcome these drawbacks.

The device in accordance with the invention is characterized by the fact that the lock is connected to the fixed part of the vehicle by means of a flexible member, adapted to run freely into a hole formed in the connecting member and so arranged as to be retained in said hole by a protrusion or head of one of its ends whilst the other end is arranged to enable its connection with a part of the steering wheel of the vehicle.

Other features of the invention will appear more clearly from the following description with reference to the accompanying drawing in which:

Fig. 1 is a sectional view of the arrangement, showing the manner in which the flexible member is connected to the connecting member;

Fig. 2 is a partial sectional view of the locking device associated to the flexible member;
Fig. 3 is a plan view of the locking device;

Fig. 4 is a front view of the support or connecting member;

Fig. 5 shows the device in position on the steering fly-wheel of a vehicle;
Fig. 6 is a view showing the device in the position of rest.

The device illustrated in the drawing consists of a stirrup 1 having a socket 2. At the end of one of the branches of the stirrup is pivoted as at 3, a combination-locking device 4 of any suitable type. The rod 5 of this locking device is provided with a button 6, the inside conical part 7 of which fits on a corresponding outside conical part 8 formed at the end of the other stirrup-branch when the locking device is in the closed position. The conical part 8 is provided with a slot 9 through which the rod 5 is adapted to pass, when a rotative movement about the pin 3 is imparted to the locking device, the latter being in the opened position.

Inside the socket 2 is engaged a wire cable 10 at the end of which is soldered a ring 11 surrounded, after soldering, by a cup 12 serving to conceal the irregularities of the soldering, and more or less protecting the latter.

A metallic plate 13 fastened to the carriage-body, by means of screws for instance, is covered by another plate 14 concealing these screws and united to an inclined socket 15, extending downward into a socket 16, and, towards the plates 13 and 14, into a hollow provided in these plates and in the wall of the carriage-body. The plate 14 is secured to the plate 13 by means of screws 17 provided with a small square head 17ª which, after screwing, is beaten off with a hammer or a chisel, so that it becomes impossible to take these screws off without a special tool equipment.

The other end of the cable 10, provided like the first named end with a soldered ring 18 and a protecting cup 19, is engaged into the socket 15 and either in the socket 16 or in the wall of the carriage-body by passing through the holes in the plates 13 and 14.

In the position of rest (Fig. 6) the cable 10 being wholly brought inside the wall of the carriage-body or hanging against it, the stirrup 1 rests on the socket 15, and the whole does not occupy more space than a door handle.

For locking the steering wheel, (Fig. 5) the whole length of the cable is drawn out, the steering flywheel is turned to a direction preventing any theft by tow, and such as to allow, the cable being completely stretched, the closing of the locking device either on the rim of the steering flywheel immediately in front of a spoke, or on a spoke of said wheel when said spokes are substantially inclined relatively to the plane of the rim.

It is to be understood that the locking device may be of any type whatsoever, with keys or letters and that the cable may be replaced by any equivalent member, for instance, by a leather strap of size and color in accordance with the other leather parts of the carriage body, so as to form a whole with the door-handles; conveniently such strap may be internally reinforced by a flexible steel band.

I claim:

1. An anti-theft device for motor vehicles comprising a connecting member secured to a fixed part of the vehicle, said connecting member having a hole formed therein adapted to permit the passage of a flexible member, a flexible member running freely in the hole of the connecting member, a protrusion or head at the end of the flexible member which is engaged in the connecting member, a shoulder or a restricted passage in the hole of the connecting member to prevent the escape of the flexible member and means secured at the free end of the flexible member adapted to enable said member to be connected to a part of the steering wheel of the vehicle.

2. An anti-theft device according to claim 1 in which the means for connecting the flexible member to a part of the steering wheel includes a fork shaped member, a combination locking device in the form of a sleeve pivotally mounted at one end to one of the branches of the fork, a restricted portion near the other end of the sleeve and a corresponding slot in the end of the other branch of the fork and means on said latter branch and on the sleeve to prevent the disengagement of the latter in the closed position of the combination locking device.

3. An anti-theft device according to claim 1, in which the means for connecting the flexible member to a part of the steering wheel includes a member having a conical end portion, a correspondingly shaped recess formed in the connecting member secured to the fixed part of the vehicle whereby the first named connecting member may be brought to a rest position in the second named connecting member.

4. An anti-theft device according to claim 1, in which the hole formed in the connecting member secured to a fixed part of the vehicle has a deflected portion opening in the rear face of said connecting member, whereby the flexible member is led inside an unaccessible hollow of the carriage body.

5. An anti-theft device according to claim 1, in which the hole formed in the connecting member secured to a fixed part of the vehicle has a deflected portion opening in the under face of the said connecting member, whereby the flexible member is led inside the vehicle.

LOUIS ROUANET.